US008061971B2

(12) United States Patent
Roush et al.

(10) Patent No.: US 8,061,971 B2
(45) Date of Patent: Nov. 22, 2011

(54) APPARATUS AND METHOD FOR COOLING A TURBINE

(75) Inventors: Eric Roush, Simpsonville, SC (US); Mark W. Flanagan, Simpsonville, SC (US); Ian David Wilson, Simpsonville, SC (US); George Frey, Houston, TX (US); John Raymond Hess, Seneca, SC (US)

(73) Assignee: General Electric Company, Schenectady, NY (US)

( * ) Notice: Subject to any disclaimer, the term of this patent is extended or adjusted under 35 U.S.C. 154(b) by 649 days.

(21) Appl. No.: 12/209,832

(22) Filed: Sep. 12, 2008

(65) Prior Publication Data

US 2010/0068035 A1    Mar. 18, 2010

(51) Int. Cl.
*F01D 25/26* (2006.01)

(52) U.S. Cl. ........................................ 415/108; 415/116

(58) Field of Classification Search .......... 415/114–117, 415/134, 135; 416/95, 96; 285/205, 305, 285/506; 60/39.182, 39.75
See application file for complete search history.

(56) References Cited

U.S. PATENT DOCUMENTS

| | | |
|---|---|---|
| 5,054,996 A | 10/1991 | Carreno |
| 6,382,903 B1 | 5/2002 | Caruso et al. |
| 6,393,825 B1 | 5/2002 | Leone et al. |
| 6,418,804 B1 | 7/2002 | Zabala et al. |
| 6,464,461 B2 | 10/2002 | Wilson et al. |
| 6,477,773 B1 | 11/2002 | Wilson et al. |
| 6,505,526 B2 | 1/2003 | Zabala et al. |
| 6,506,021 B1 | 1/2003 | Wilson et al. |
| 6,710,479 B2 | 3/2004 | Yoshida et al. |
| 7,798,767 B2 * | 9/2010 | Kondo et al. ................. 415/108 |

* cited by examiner

*Primary Examiner* — Quoc Hoang
(74) *Attorney, Agent, or Firm* — Nixon & Vanderhye P.C.

(57) ABSTRACT

A cooling system for a turbine includes a blower configured to generate a cooling gas flow to be passed through a rotor cavity of the turbine; piping configured to deliver the cooling gas flow to the turbine; and at least one valve configured to control the cooling gas flow. The piping is operatively connected to the rotor of the turbine. A method of cooling a turbine includes generating a cooling gas flow with a blower to be passed through a rotor cavity of the turbine; and delivering the cooling gas flow to the turbine.

19 Claims, 1 Drawing Sheet

APPARATUS AND METHOD FOR COOLING A TURBINE

FIELD OF THE INVENTION

The invention relates to an apparatus and method for cooling a turbine.

BACKGROUND OF THE INVENTION

A gas turbine engine conventionally includes a compressor for compressing ambient air for being mixed with fuel and ignited to generate combustion gases in a combustor. A turbine receives the hot combustion gases and extracts energy therefrom for powering the compressor and producing output power, for example for powering an electrical generator. The turbine conventionally includes one or more stages of stator nozzles or vanes, rotor blades and annular shrouds around the turbine blades for maintaining appropriate clearances therewith. As the turbine inlet temperatures have increased to improve the efficiency of gas turbine engines, it has become necessary to provide a cooling fluid, such as air, to the turbine vanes, blades and shrouds to maintain the temperatures of those components at levels that can be withstood by the materials thereof, to ensure a satisfactory useful life of the components. Cooling is typically accomplished by extracting a portion of the air compressed by the compressor from the compressor and conducting it to the components of the turbine to cool the same. Any air compressed in the compressor and not used in generating combustion gases necessarily reduces the efficiency of the engine. Therefore, it is desirable to minimize the amount of cooling air bled from the compressor.

Turbo-machinery performance and reliability are impacted by the clearances between rotating and static hardware. Tighter clearances produce higher efficiencies, but also increase the likelihood of damage from rubs. During operation, the casing of the gas turbine cools off much faster than the rotor on a typical turbine rotor. During a warm or hot restart, the thermal mismatch between the casing and the rotor may cause the rotor to have a greater initial component of thermal growth than the stator and then, as the unit increases in speed, the rotor experiences an additional component of mechanical growth. This causes a transient clearance pinch point. As time progresses and the stator heats up, the casing grows away from the rotor and results in more open full speed full load (FSFL) clearances. The build clearances of a unit must be set in such a way as to avoid a rub during the transient pinch point and still be tight at FSFL. The difference in minimum clearance to FSFL clearance is defined as "entitlement." The entitlement is determined by the thermal mismatch between rotor and casing.

Previous attempts to address this problem have included active clearance control systems. For example, an inner turbine shell may be heated with a medium (e.g. air, $N_2$, steam) during startup to grow the stator away from the rotor or to be cooled at FSFL to bring the shell closer to the rotor. As another example, a hydraulic ram may be used to move the rotor axially into position after the unit has reached FSFL. The angle of the bucket tips and the casing shrouds in the turbine are greater than the associated angle and the compressor and this angle mismatch enables the elimination of rub between the bucket tips and the casing shrouds during the transient pinch point.

The prior attempts to avoid a rub during the transient pinch point require relatively large clearances between the buckets and the casing and/or the use of an expensive system to be continuously run to achieve clearances during operation of the gas turbine at FSFL.

BRIEF DESCRIPTION OF THE INVENTION

According to one embodiment, a cooling system for a turbine, comprises a blower configured to generate a cooling gas flow to be passed through a rotor cavity of the turbine; piping configured to deliver the cooling gas flow to the turbine; and at least one valve configured to control the cooling gas flow. The piping is operatively connected to the rotor of the turbine.

A method of cooling a gas turbine comprises method of cooling a turbine comprises generating a cooling gas flow with a blower to be passed through a rotor cavity of the turbine; and delivering the cooling gas flow to the turbine.

DETAILED DESCRIPTION OF THE INVENTION

Figure 1:
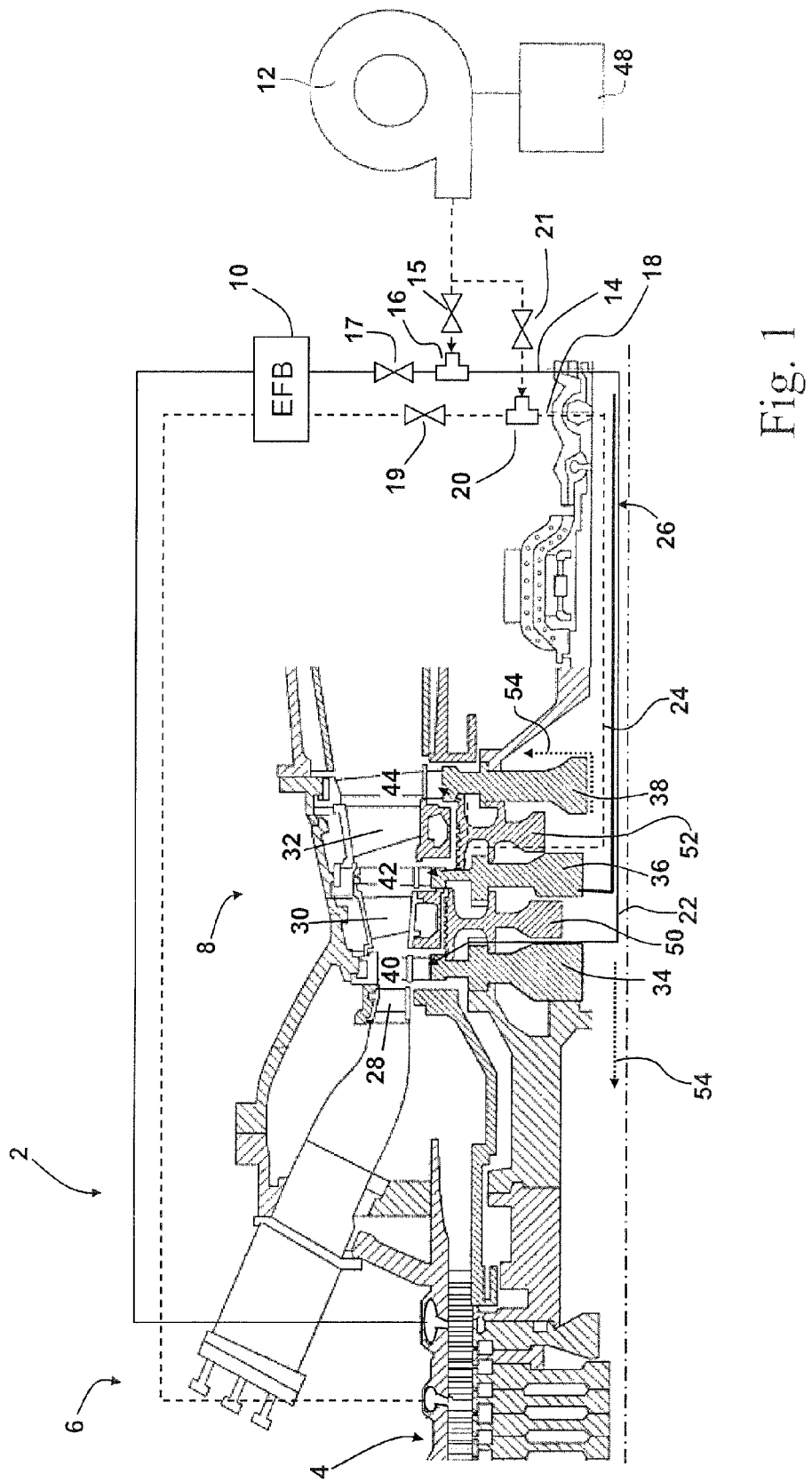
FIG. 1 schematically depicts a turbine including an apparatus for cooling the gas turbine according to an embodiment of the invention.

Referring to FIG. 1, a gas turbine 2 comprises a compressor section 4 and a combustor 6. The compressor may be an axial compressor having alternating rows of stator vanes and rotor blades arranged in a plurality of stages for sequentially compressing the air, with each succeeding downstream stage increasing the pressure higher and higher until the air is discharged from a compressor outlet at maximum pressure. The combustor 6 receives the compressed outlet air from the compressor portion 4. Conventional fuel supply conduits and injectors (not shown) are further provided for mixing a suitable fuel with the compressed outlet air for undergoing combustion in the combustor 6 to generate hot combustion gases.

The turbine section 8 is downstream from the combustor 6 and the energy of the hot combustion gases is converted into work by the turbine section 8. The hot gases are expanded and a portion of the thermal energy is converted into kinetic energy in a nozzle section of the turbine section 8. The nozzle section includes a plurality of stator blades, or nozzles, 28, 30, 32. For example, a first stage nozzle includes a stator blade 28, a second stage nozzle includes a stator blade 30, and a third stage comprises a stator blade 32.

The turbine section 8 also includes a bucket section. In the bucket section, a portion of the kinetic energy is transferred to buckets 40, 42, 44 that are connected to rotor wheels 34, 36, 38, respectively, and is converted to work. The wheel 34 and the bucket 40 form the first stage, the wheel 36 and the bucket 42 for the second stage, and the wheel 38 and the bucket 44 form the third stage. Spacers 50, 52 may be provided between each pair of rotor wheels.

During a shutdown of the turbine 2, a blower 12 is provided to cool down the rotor of the turbine section 8. The blower 12 may be connected to the inner diameter of an aft shaft 26 of an aft disk by stage 1 piping 14 that is configured to deliver a flow of air between the first and second stages, and by stage 2 piping 18 that is configured to deliver a flow of air between the second and third stages. A first set of check valves, including a blower check valve 15 and a piping check valve 17, may be provided in the stage 1 piping 14. A second set of check valves, including a blower check valve 21 and a piping check valve 19, may be provided in the stage 2 piping 18. Mixing tees 16, 20 may be provided in the stage 1 and stage 2 piping, respectively. Alternatively, the blower 12 may be replaced with a vacuum to draw air out of the turbine 2.

The blower 12 is connected to the gas turbine 2 by an externally fed bore (EFB) circuit 10 which may be, for example, a bucket supply system. For existing gas turbines, the blower may be retrofitted to the gas turbine 2 by retrofitting a bore plug under the aft shaft 26. The blower piping 14, 18 can be connected to the inner diameter of the aft shaft 26 and used in conjunction with the check valves 15, 17, 19, 21. During normal operation, i.e., non-shutdown conditions, the blower 12 is off and the blower check valves 15, 21 are closed and the piping check valves 17, 19 are open.

During operation at any speed, which may include shutdowns, between trips, while purging, etc., of the gas turbine 2, the blower 12 is operated to cool down the rotor of the turbine section 8 and the blower 12 is sized and timed such that it forces the cooling rate of the rotor to the same speed as or faster than the cooling rate of the casing of the gas turbine 2. This allows the gas turbine 2 to be restarted at any time and have the rotor equal to or cooler than the stator temperatures. The operation of the blower 12 may be controlled by a controller 48. The controller 48 may be a specially programmed general purpose computer, or a microprocessor. The controller 48 may also be an ASIC. The controller 48 may control the operation of the blower 12 based on signals from temperature sensors in the turbine section, e.g. the rotor, and the casing that are sent to the controller 12. The blower 12 may be used for cooling other plant hardware during FSFL operation, such as exhaust frames/casings.

The first blower check valve 15 and the second blower check valve 21 are configured to open when a predetermined gaseous flow is generated by the blower 12. Concurrently, the first piping check valve 17, and the second piping check valve 19, are configured to close such that all blower flow be directed to the turbine section 8. It should be appreciated that the first check valve set 15, 17 and the second check valve set 19, 21 may be configured to open at the same, or different, gaseous flows. For example, the first check valve set 15, 17 may be configured to open at a first gaseous flow, and the second check valve set 19, 21 may be configured to open at a second gaseous flow that is higher than the first gaseous flow. It should be appreciated that other valves than check valves may be used. It should be further appreciated that the controller 48 may be configured to control the operation of the valves.

As shown in FIG. 1, the cooling flow 22 of stage 1 is shown in solid lines, the cooling flow 24 of stage 2 is shown in dashed lines, and a turbine purge 54 flow is shown in dotted lines.

The use of the EFB circuit 10 and the blower 12 provides the gas turbine 2 with sufficient clearance as the mechanical growth and out of roundness allow at a lower cost relative to the active clearance control options of prior art systems. The gas turbine 2 provided with the blower 12 and the EFB circuit 10 is able to run with tighter clearances and does not require an expensive system that continuously runs to achieve the required clearances. The blower 12 is run at non-FSFL conditions when the rotor is hotter than the casing. It can also be used to perform other plant functions, such as exhaust frame cooling during FSFL.

Heat transfer analysis may be performed that simulates the blower cooling the rotor of the turbine section 8 during a shutdown to determine how much air flow is required to match the stator time constant to match the cooling rate of the rotor to the cooling rate of the casing of the gas turbine 2. The clearances are thus controlled by matching the shutdown time constants with rotor augmentation. Unlike prior art systems, which use clearance control systems that deal with moving the stator during either startup or FSFL, the gas turbine 2 provided with the blower 12 and EFB circuit 10 has advantages in that it is operates on the rotor during non-design points so is relatively inexpensive in terms of product cost and does not represent a drain on the performance of the gas turbine 2 during FSFL.

Although the embodiment described above is in the context of a gas turbine, it should be appreciated that the cooling apparatus and method described above are also applicable to steam turbines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling system for a turbine, comprising:
   a blower configured to generate a cooling gas flow to be passed through a rotor cavity of the turbine;
   piping connecting the blower to an aft shaft of the turbine, the piping being configured to deliver the cooling gas flow between stages of the turbine; and
   at least one valve configured to control the cooling gas flow; and
   wherein the piping is operatively connected to the rotor of the turbine.

2. A cooling system according to claim 1, wherein the at least one valve is configured to be closed during full speed, full load operation of the turbine and configured to be open during non-baseload operation of the turbine.

3. A cooling system according to claim 1, further comprising a controller configured to control the operation of the blower to provide the cooling gas flow such that a cooling rate of the rotor is accelerated compared to operation without the blower.

4. A cooling system according to claim 1, further comprising a controller configured to control the operation of the at least one valve.

5. A cooling system according to claim 1, wherein the cooling system is connected to an external cooling delivery circuit.

6. A cooling system according to claim 1, wherein the blower is operated as a vacuum to pull cooling gas from within the turbine.

7. A cooling system according to claim 1, wherein the cooling gas flow comprises air.

8. A turbine comprising the cooling system of claim 1.

9. A turbine according to claim 8, wherein the turbine is a gas turbine.

10. A cooling system according to claim 1, wherein the piping comprises first stage piping configured to deliver the cooling gas flow between the first and second stages of the turbine.

11. A cooling system according to claim 10, wherein the at least one valve comprises a first blower check valve operatively connected to the blower and a first piping check valve operatively connected to the first stage piping of the turbine.

12. A cooling system according to claim 11, wherein the piping comprises second stage piping configured to deliver the cooling gas flow between the second and third stages of the turbine.

13. A cooling system according to claim 12, wherein the at least one valve further comprises a second blower check valve operatively connected to the blower and a second piping check valve operatively connected to the second stage piping of the turbine.

14. A method of cooling a turbine, comprising:

generating a cooling gas flow with a blower to be passed through a rotor cavity of the turbine; and delivering the cooling gas flow between stages of the turbine through piping that connects the blower to an aft shaft of the turbine, wherein the delivery of the cooling gas flow is controlled by at least one valve.

15. A method according to claim 14, wherein generating the cooling gas flow comprises generating the cooling gas flow outside a casing of the turbine.

16. A method according to claim 14, wherein the cooling gas flow is generated during a non-baseload operation of the turbine.

17. A method according to claim 14, wherein the cooling gas flow is generated such that a cooling rate of the rotor of the turbine is accelerated compared to operation without the blower.

18. A method according to claim 14, wherein the cooling gas flow comprises air.

19. A method according to claim 14, wherein delivering the cooling gas flow between stages of the turbine through piping comprises delivering the cooling gas flow through first stage piping between first and second stages of the turbine.

* * * * *